United States Patent
Everaerts et al.

(10) Patent No.: US 6,509,128 B1
(45) Date of Patent: Jan. 21, 2003

(54) IMAGEWISE PRINTING OF ADHESIVES AND LIMITED COALESCENCE POLYMERIZATION METHOD

(75) Inventors: Albert I. Everaerts, Oakdale, MN (US); Lang N. Nguyen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/697,008

(22) Filed: Oct. 25, 2000

(51) Int. Cl.$^7$ ............................................... G03G 19/00
(52) U.S. Cl. ........................ 430/39; 430/97; 430/111.4
(58) Field of Search ........................... 430/39, 97, 111.4

(56) References Cited

U.S. PATENT DOCUMENTS

| | | |
|---|---|---|
| 2,736,721 A | 2/1956 | Dexter |
| 4,204,023 A | 5/1980 | Witt |
| 4,248,748 A | 2/1981 | McGrath et al. |
| 4,461,823 A | 7/1984 | Held |
| 4,507,378 A | 3/1985 | Wada et al. |
| 5,088,047 A | 2/1992 | Bynum |
| 5,112,882 A | 5/1992 | Babu et al. |
| 5,114,520 A | 5/1992 | Wang, Jr. et al. |
| 5,214,119 A | 5/1993 | Leir et al. |
| 5,238,736 A | 8/1993 | Tseng et al. |
| 5,322,731 A | 6/1994 | Callahan, Jr. et al. |
| 5,361,089 A | 11/1994 | Bearss et al. |
| 5,385,771 A | 1/1995 | Willetts et al. |
| 5,536,786 A | 7/1996 | Callahan, Jr. et al. |
| 5,585,215 A | 12/1996 | Ong et al. |
| 5,599,618 A | 2/1997 | Callahan, Jr. et al. |
| 5,625,006 A | 4/1997 | Callahan, Jr. et al. |
| 5,709,340 A | 1/1998 | Chao |
| 5,721,289 A | 2/1998 | Karim et al. |
| 5,736,228 A | 4/1998 | Morris et al. |
| 6,060,204 A | 5/2000 | Knapp et al. |
| 6,187,498 B1 | 2/2001 | Knapp et al. |

FOREIGN PATENT DOCUMENTS

| | | |
|---|---|---|
| EP | 0 034 816 | 9/1981 |
| EP | 0 193 726 | 9/1986 |
| EP | 0 524 016 | 1/1993 |
| EP | 0 620 259 A2 | 10/1994 |
| EP | 0 989 143 A1 | 3/2000 |
| JP | 3-69960 | 3/1991 |
| WO | WO 99/42536 | 8/1999 |
| WO | WO 00/56543 | 9/2000 |
| WO | WO 00/56830 | 9/2000 |

OTHER PUBLICATIONS

ASTM D–1002–72, "Standard Test Method for Strength Properties of Adhesive in Shear By Tension Loading (Metal–to–Metal)," Annual Book of ASTM Standards, vol. 02.04, pp. 60–64 (1983).
Schein L.B., *Electrophotography and Development Physics*, N.Y., Springer–Verlag, Chapter 12, pp. 275–325 (1992).
Database WPI, Section Ch, Week 199104, Derwent Publications Ltd., London, GB; AN 1991–025281, XP00217168 & JP 02 294378 A (Kohlin), Dec. 5, 1990.
Database WPI, Section Ch, Week 198351, Derwent Publications Ltd., London, GB; AN 1983–848399, XP002171688 & JP 58 196276 A (Toyo Ink), Nov. 15, 1983.
Binda et al., "Electro–Magnetic Brush Technology: A New High Speed Application System for Coating Flat Substrates", IOM Congress, Recent Developments in UV Curing Technology for the Printing and Converting Industries, Nov. 25–26, 1998, Leipzig, Germany.
Fox, *Bull. Am. Phys. Soc. (Ser. 2)*, 1:123 (1956).
"Handbook of Pressure Sensitive Adhesive Technology", Donatas Satas (Ed.), 2$^{nd}$ Edition, Van Nostrand Reinhold, New York, NY, pp. 172–173 (1989).
Schaffert, "Electrophotography", Focal Press, London & New York, pp. 178–190 (1975).

*Primary Examiner*—Mark A. Chapman
(74) *Attorney, Agent, or Firm*—Scott R. Pribnow

(57) ABSTRACT

Methods of imagewise printing of adhesives that includes providing a latent adhesive image and then activating the latent adhesive image to form an adhesive image. Methods of preparing latent adhesive toners that involve limited coalescence.

32 Claims, No Drawings

IMAGEWISE PRINTING OF ADHESIVES AND LIMITED COALESCENCE POLYMERIZATION METHOD

FIELD OF THE INVENTION

This invention relates to the imagewise printing, particularly electrophotographic printing, of adhesives, and particularly acrylate-based adhesives, that have latent adhesive properties, particularly latent pressure sensitive adhesive properties.

BACKGROUND

Pattern coating of adhesives is of significant importance in the assembly industry. For example, pattern coating of adhesives is needed in the application of border adhesives in medical electrodes, laminating adhesives in membrane switches, attachment adhesives in electronic packaging and electronic. circuit boards.

Pattern coating of adhesives is generally a more economical alternative to the use of film adhesives, which involves die-cutting and a significant amount of manual handling to apply the adhesive to the part. Printable adhesives are available in a number of formats, ranging from solvent-borne, water-borne to UV-curable reactive monomer/oligomers. All of these materials require a drying or curing step, which would be desirable to eliminate. Also, between coating operations the equipment needs thorough clean-up, often involving solvents, which would also be desirable to eliminate. Hot-melt screen printing is yet another alternative to pattern coating of adhesives. Not only is the hot-melt handling a safety concern, but the melt Theological behavior of the adhesives can be a roadblock to successful implementation. Thus, what is needed is a more economical and efficient means of pattern coating adhesives.

One such way can include the use of electrostatic means, magnetic means, or both. One particular such example involves the use of electrophotography. A general discussion of color electrophotography is presented in "Electrophotography", by R. M. Schaffert, Focal Press, London & New York, 1975, pages 178–190. In general, in electrophotography, copies or printed materials are obtained by forming an electrostatic latent image utilizing a photoconductive material (i.e., photoconductor). The photoconductor is entirely charged with a charging device and then exposed in an imagewise fashion to light to form an electrostatic latent image thereon. The electrostatic latent image is subsequently developed with a dry toner to form a toner image on the photoconductor. The toner image (i.e., the "real" image) is transferred onto an image receiving material such as a paper sheet. This can occur by direct or indirect means. The toner image transferred on the image receiving material is then fixed upon application of heat, pressure, solvent vapor, or a combination thereof. The toner that is not transferred and is left on the photoconductor is removed by various means if necessary, and then the above process is repeated.

Dry toners for use in such image forming methods typically include a binder resin and a colorant, and optionally include a charge controlling agent, a fixing agent, and a releasing agent. The properties requisite for these dry toners include good fixing ability, charging ability, fluidity, stability to environmental changes, and mechanical strength.

In general, the particle size of such dry toners is in a range from a few microns (i.e., micrometers) to about 30 microns. These particle sizes can be obtained by pulverizing the toners or by polymerization techniques. However, the majority of such polymers used in toners have not been shown to have adhesive properties sufficient to hold substrates together.

Limited uses of electrophotography of adhesive toners have been demonstrated, however. For example, U.S. Pat. No. 5,361,089 (Bearss et al.) discloses the imagewise electrographic printing of adhesive toners onto imaged color toners to enhance subsequent transfer of the toner image to a substrate; however, the composition of the adhesive toners is not disclosed. Also, U.S. Pat. No. 5,599,618 (Callahan, Jr. et al.) discloses the application of core-shell pressure sensitive adhesive particles via electrostatic means, magnetic means, or both. Such core-shell pressure sensitive adhesive particles include a nontacky outer shell and a pressure sensitive adhesive core that is exposed upon activation of the particles, for example, by application of pressure.

Other adhesives capable of being imagewise printed, as well as other means of imagewise printing adhesives, and methods of making such adhesives are still needed.

SUMMARY OF THE INVENTION

The present invention is directed to latent adhesive toners, methods of making such adhesive toners, and imagewise printing processes, particularly electrophotographic printing processes, of such latent adhesive toners. The latent adhesive toners typically include dry particles (e.g., powders) having latent adhesive properties, optionally dispersed in a liquid carrier. Preferably, there is no liquid carrier thereby making the printing process a 100% solids operation. Typically, for 100% solids operations clean-up is simpler, switching between adhesives is simpler, and precautions in the handling of the adhesives is simpler, only requiring the handling of powders. This makes preferred processes of the present invention an excellent fit for short run operations.

The resolution of the printed image is mostly limited by the quality of the powder utilized. Using the adhesive toners described herein, high resolution can indeed be obtained. The print pattern is readily altered by simply changing the image on the photo-receptor which can be done within seconds using a pattern stored in a computer. New patterns can be computer designed within minutes. The development of the adhesive properties can be done in line with printing and does not require any manual handling of the material.

Such imagewise printed adhesives are useful in the manufacture of medical electrodes, membrane switches, electronic packaging, electronic circuit boards, graphic articles, retroreflective articles, labels, note pads, etc.

In one embodiment of the invention, there is provided a method of applying an adhesive to a substrate in an imagewise fashion. The method includes: providing a substrate having a latent adhesive image thereon; and applying a plasticizing agent to activate the latent adhesive image to form an adhesive image. Preferably, providing a substrate having a latent adhesive image thereon includes providing a substrate; applying a latent adhesive toner in an imagewise fashion to the substrate; and fusing the latent adhesive toner to the first substrate to form a latent adhesive image.

The plasticizing agent can be applied before, during, or after the latent adhesive toner is applied as long as precautions are taken to prevent activation of the latent adhesive until the desired time. For example, a plasticizing agent can be applied in a solid form or in an encapsulated form and heat applied to melt the plasticizing agent and cause it to activate the latent adhesive.

In another embodiment, there is provided a method of adhering substrates together using an adhesive printed in an imagewise fashion. The method includes: applying a latent adhesive toner in an imagewise fashion to a first substrate, wherein the latent adhesive toner comprises single-composition latent adhesive particles; fusing the latent adhesive toner to the first substrate to form a latent adhesive image; activating the latent adhesive image to form an adhesive image; and applying a second substrate to the adhesive image disposed on the first substrate. Preferably, the latent adhesive toner includes latent adhesive particles of an acrylic, urethane, phenolic, polyimide, cyanate ester, or epoxy. In another embodiment, the latent adhesive toner includes particles of a latent adhesive acrylic polymer with crystalline side chains. In yet another embodiment, the latent adhesive toner includes latent adhesive particles of an epoxy-acrylic or epoxy-polyester structural or semi-structural adhesive. In still another embodiment, the latent adhesive toner includes latent adhesive particles of a polyester or polyamide adhesive.

In yet another embodiment, there is provided a method of adhering substrates together using an adhesive printed in an imagewise fashion that includes: applying a latent adhesive toner in an imagewise fashion to a first substrate, wherein the latent adhesive toner includes structural or semi-structural latent adhesive particles; fusing the latent adhesive toner to the first substrate to form a latent adhesive image; activating the latent adhesive image to form an adhesive image; and applying a second substrate to the adhesive image disposed on the first substrate.

The present invention also provides a method of making a latent adhesive toner that includes polymer particles. The method includes: providing polymerizable monomers and a colloidal stabilizer under conditions effective to form a polymer; subjecting the polymer to shearing forces to form polymer particles or 1 micron or less particle size; and adjusting the pH to reduce the amount of coagulation of the polymer particles.

As used herein:
"adhesive" refers to the adhesive composition, and may also refer to the adhesive layer of an adhesive article;
"latent adhesive" refers to an adhesive that does not have adhesive properties (e.g., is not tacky) during imagewise printing but does once it is activated, as by the application of heat, plasticizing agent, etc.;
"latent, over-tackified, adhesive" refers to an adhesive that does not have adhesive properties (e.g., is not tacky) due to a relatively large amount of tackifier, but does acquire adhesive properties once it is activated by the application of a plasticizing agent;
"pressure sensitive adhesive" or "PSA" refers to a viscoelastic material that possesses the following properties: (1) aggressive and permanent tack, (2) adherence with no more than finger pressure, (3) sufficient ability to hold onto an substrate, and (4) sufficient cohesive strength to be removed cleanly from the substrate;
"compatible" refers to plasticizing agents that: (1) exhibit no gross phase separation from the latent adhesive when combined in the prescribed amounts; (2) once mixed with the latent adhesive, do not significantly phase separate from the latent adhesive upon aging; and (3) function as a rheological modification agent for the latent adhesive, such that the plasticized composition exhibits pressure sensitive properties as defined above;
"non-volatile" refers to plasticizing agents that, when combined with the latent adhesives of this invention, generate less than 3% VOC (volatile organic content). The VOC content can be determined analogously to ASTM D 5403-93 by exposing the coated composition to 100±5° C. in a forced draft oven for 1 hour. If less than 3% plasticizing agent is lost from the plasticized pressure sensitive adhesive composition, then the plasticizing agent is considered "non-volatile"; and
"single-composition" particles include one or more components as long as the particle has a substantially uniform composition across a cross-section of the particle.

DESCRIPTION OF THE PREFERRED EMBODIMENT(S)

This invention relates to latent adhesives and methods of imagewise applying latent adhesives and activating the adhesives, for example, to adhere substrates together. Although the present description is primarily directed to electrophotographic printing of acrylate-based latent pressure sensitive adhesives, the invention is not limited to such methods and adhesives. A wide variety of adhesives, whether pressure sensitive or not, and imagewise printing methods, whether based on electrophotography or not, are encompassed by the present invention.

In the methods of the present invention, latent adhesive particles (which can optionally be combined with other components, such as a liquid carrier, and referred to as a "latent adhesive toner") are: applied in an imagewise fashion to a substrate; optionally transferred to an image receiving material; fused to enhance bonding between the particles and the receiving material or substrate to which the image was directly applied (and preferably fused further to coalesce the particles into a film); and activated to provide adhesive properties, preferably pressure sensitive adhesive properties, using an activation aid. The activation aid can be heat or other forms of radiation, a curing agent (e.g., curative, hardener, catalyst), or a plasticizer, for example, and functions to provide adhesive properties to the adhesive after it is printed in an imagewise fashion.

One of the advantages of using the latent adhesives (preferably, single-composition latent adhesives) described herein is the ability to deliver the latent adhesive as a solid powder in an imagewise fashion, with or without a liquid carrier. In addition to conventional polymerization methods used to prepare such powders, including, for example, spray dried emulsion, suspension, and dispersion polymerization processes, the latent adhesives in powdered form can also be prepared using mechanical techniques such as cryo-grinding or hammer milling. A particularly preferred limited coalescence polymerization method is described herein for obtaining a relatively narrow particle size distribution.

Preferably, the latent adhesive particles are single-composition latent adhesive particles. That is, they do not include a core-shell configuration (e.g., with a pressure sensitive adhesive core and a nonpressure sensitive adhesive shell), for example. It should be understood, however, that a single-composition particle can include more than one component as long as the particle has a substantially uniform composition across a cross-section of the particle. Such single-composition particles are preferred because they can be generally more storage stable, they are typically easier to manufacture, and the shell material does not interfere with development of pressure sensitive properties.

It is particularly desirable for a latent adhesive toner according to the present invention to include latent adhesive particles have a number average particle size (i.e., the largest dimension of a particle, typically, the diameter of spherical particles) of about 1 micron (i.e., micrometers) to about 50 microns, preferably, about 5 microns to about 25 microns. The particle size can be obtained using a particle size analyzer as described in the Examples Section. These particle size ranges are desirable for obtaining images of high definition. When the particle size is less than 1 micron, the handling thereof as a dry powder becomes difficult, inhalation hazards exist, and manufacturing costs increase, for example. When the particle size exceeds 50 microns, fine dot latent images cannot be faithfully developed or reproduced and fusion is more difficult and slower, for example.

In addition, it is desirable that the latent adhesive toner includes latent adhesive particles that have a coefficient variation of particle size of not more than about 20%. The width of the particle size distribution greatly contributes to the reproducibility of the images, particularly in the transferring process of an electrophotography process. That is, even though the average particle size is within the preferred ranges above, when the coefficient of variation exceeds 20%, the uniformity of the charge density decreases, which results in less flowability and could possibly result in less uniform image formation.

Once a latent adhesive toner is applied to a substrate in an imagewise fashion and optionally transferred to a second substrate (often referred to as an image receiving material), fused to enhance adhesion to the substrate, the resultant latent adhesive image is one that can be used to bond to another substrate once an activation aid is applied to convert the latent adhesive to an adhesive, thereby bonding two substrates together. Fusion typically occurs upon the application of heat. Sufficient heat can be used to fuse the particles completely into a smooth latent adhesive coating, or all or part of the particle character of the latent adhesive image can be maintained.

The latent adhesive toner is typically applied at a thickness that is significantly greater than conventional toners for good bonding characteristics. Generally, conventional toners are applied at a thickness of about 5 microns, whereas the thickness of latent adhesive layers prepared from the latent adhesive particles described herein are applied at a much higher thicknesses. Preferably, the thickness of the adhesive layers formed according to the present invention is at least about 20 microns.

Multiple layers of latent adhesive can be applied to a substrate using the same or different latent adhesive toners. If desired, these layers can be optionally separated by nonadhesive layers. Methods for formation of multilayered (three-dimensional) images can be prepared using methods as described in U.S. Pat. No. 5,088,047 (Bynum).

Upon the application of an activation aid, all or a portion of the latent adhesive image is activated to a material having adhesive properties, particularly pressure sensitive adhesive properties, structural adhesive properties, or semi-structural adhesive properties. Activation aids include heat or other forms of radiation, plasticizer, organic solvent, water, curing agent (e.g., curative, catalyst, hardener), and combinations thereof. Such activation aids can be optionally supplemented with the application of pressure. It should be understood that the fusing process typically involves the application of heat. Accordingly, if the latent adhesive is activated by heat, the fusing process should not deleteriously affect the subsequent activation of the latent adhesive.

The activation aid can be applied in a variety of manners. For. example, a plasticizer can be applied in solid or liquid form. It can be encapsulated and applied in an imagewise fashion using the same or similar techniques as used to imagewise print the latent adhesive toner. It can be sprayed onto the image, or the image can be otherwise overlaid with plasticizer (e.g., in powder or film form). For example, unplasticized latent adhesive can be coated with a solid plasticizer in the form of a powder, film, particles, and the like, and heated to a temperature sufficient to melt the plasticizer and activate the adhesive (preferably, pressure sensitive adhesive, structural adhesive, or semi-structural adhesive, and more preferably, pressure sensitive adhesive) properties of the combined latent adhesive and the plasticizer. Solid, powdered plasticizing agents can be prepared using similar mechanical methods as described above for the latent adhesive. Alternatively, a liquid plasticizing agent can be applied by means of spray, flood, or other liquid delivery techniques (such as ink jet) to the areas of the latent adhesive image.

Latent Adhesives

The latent adhesives can include a wide variety of art known adhesives, preferably one that is aggressively tacky and forms strong bonds on contact with substrates once activated. Non-pressure sensitive adhesives, thermally-activatable, chemically-activatable (by solvent, plasticizer, etc.) adhesives, water-activatable adhesives, etc. may be used if desired. Suitable adhesives preferably do not cure or become permanently tacky during the application of the latent adhesive toner and its subsequent fusing. Some conversion of the latent adhesive can occur as long as the adhesive can be subsequently activated by the activation aid.

A preferred latent pressure sensitive adhesive useful in the present invention includes the plasticizer-activatable high Tg acrylic polymer based pressure sensitive adhesives disclosed in International Publication No. WO 00/56830 (published Sep. 28, 2000). Such adhesives include a base copolymer having a Tg greater than about 10° C., wherein the base copolymer is formed from: about 50% to about 70% by weight of a high Tg comonomer component, wherein the homopolymer formed from the high Tg comonomer component has a Tg of at least about 20° C.; optionally, up to about 20% by weight based on the total weight of the base copolymer of an acidic comonomer; and about 30% to about 50% by weight of one or more low Tg (meth)acrylate comonomer, wherein the Tg of the homopolymer of the low Tg comonomer is less than about 20° C. To activate the base copolymer to form a pressure sensitive adhesive, about 1 part to about 100 parts, based on 100 parts of the base copolymer, of a plasticizing agent is added. The plasticizer is typically added subsequent to forming a latent image with the base copolymer.

Another preferred latent adhesive is one that includes an elastomer and a large amount of tackifying resin, the latter being included in sufficient amount to lower the adhesive characteristics of the adhesives to a level needed for convenient and effective room-temperature handling of sheets printed with the adhesive, while leaving the adhesive with the capacity for strong activatable bonds (e.g., plasticizer- and/or heat- activatable bonds). Such adhesives are referred to herein as "over-tackified" adhesives. Examples of over-tackified, heat-activatable, adhesives are disclosed in U.S. Pat. No. 4,248,748 (McGrath et al.).

In such "over-tackified" adhesives, the tackifying resins are generally well-known resins, which are typically thermoplastic, resinous, room-temperature solids characterized by their ability to increase the glass transition temperature (Tg) and tackiness of an elastomer. Tackiness can be measured by a variety of tests, such as the "inclined trough" or "rolling ball" test in which a stainless steel ball is allowed to roll down an inclined trough at the bottom of which a tape coated with the mixture being tested is supported. Useful tackifying resins will usually increase the tackiness of conventional pressure sensitive adhesive polymers when added in typical amounts of 20 to 100 parts per 100 parts of adhesive polymer. Over-tackified adhesives will usually result when tackifying resins are added in amounts higher than needed to make a pressure sensitive adhesive.

Naturally occurring materials, which are typically complex mixtures of high-molecular-weight organic acids and related neutral materials, are a common form of tackifying resin. Wood or other rosins, or modified forms of such naturally occurring rosins, e.g., hydrogenated or esterified rosins, are particularly useful. Polymers of terpene, pinene, etc., and low-molecular-weight styrene resins are also useful. Examples of other suitable tackifying resins are listed below.

The over-tackified adhesives can be derived from an elastomer that is typically used in pressure sensitive adhesives. Such over-tackified adhesives are low in tack or totally tack-free at room temperature (i.e., about 20° C. to about 25° C.). They derive their low tack or no tack characteristics at room temperature from their high glass transition temperatures (typically, at least about 10° C.) and/or high shear storage moduli (typically, at least $5 \times 10^5$ Pascals at 23° C. and 1 Hz). To transform the over-tackified adhesive to a material that exhibits pressure sensitive adhesive properties, a plasticizing agent is used. Suitable plasticizing agents are those that can lower the latent adhesive's Tg to below about 10° C., preferably below 0° C., and its shear storage modulus to below the Dahlquist Criterion, which is defined in the *Handbook of Pressure Sensitive Adhesive Technology*, Donatas Satas (Ed.), $2^{nd}$ Edition, pp. 172–173, Van Nostrand Reinhold, New York, N.Y., 1989.

Examples of latent "over-tackified" pressure sensitive adhesives useful in the present invention include natural rubbers, synthetic rubbers, styrene block copolymers, (meth) acrylics, poly(alpha-olefms), and silicones.

Latent, over-tackified, natural rubber adhesives include natural rubber that may range in grade from a light pale crepe grade to a darker ribbed smoked sheet and includes such examples as CV-60, a controlled viscosity rubber grade and SMR-5, a ribbed smoked sheet rubber grade. Tackifying resins used to over-tackify natural rubbers generally include, but are not limited to, wood rosin and its hydrogenated derivatives, terpene resins of various softening points, and petroleum-based resins.

Latent, over-tackified, synthetic rubber adhesives include synthetic rubbers that are generally rubbery elastomers, such as butyl rubber, a copolymer of isobutylene with less than 3 percent isoprene, polyisobutylene, a homopolymer of isoprene, polybutadiene, styrene/butadiene rubber, polybutadiene or styrene/butadiene rubber. An example of a synthetic rubber is that commercially available from B. F. Goodrich under the trade designation "AMERIPOL 101 IA," a styrene/butadiene rubber. Tackifiers that are useful to over-tackify synthetic rubbers include derivatives of rosins, polyterpenes, C5 aliphatic olefin-derived resins, and C9 aromatic/C5 aliphatic olefin-derived resins.

Latent, over-tackified, styrene block copolymer adhesives generally include elastomers of the A-B or A-B-A type, where A represents a thermoplastic polystyrene block and B represents a rubbery block of polyisoprene, polybutadiene, or poly(ethylene/butylene), and resins. Examples of the useful block copolymers include linear, radial, star and tapered styrene-isoprene block copolymers such as those commercially available from Shell Chemical Co. under the trade designations "KRATON D1107," "KRATON G1657," "KRATON G1750," and "KRATON D1118." The polystyrene blocks tend to form domains in the shape of spheroids, cylinders, or lamallae that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as those commercially available from Goodyear under the trade designations "ESCOREZ 1300" and "WINGTACK"; rosin esters, such as those commercially available from Hercules, Inc. under the trade designations "FORAL" and "STAYBELITE Ester 10"; hydrogenated hydrocarbons, such as that commercially available from Exxon under the trade designation "ESCOREZ 5000"; polyterpenes, such as that commercially available from Hercules, Inc. under the trade designation "PICCOLYTE A"; and terpene phenolic resins derived from petroleum or terpentine sources, such as that commercially available under the trade designation "PICCOFYN A100." Resins that associate with the thermoplastic phase tend to stiffen the pressure sensitive adhesive.

Latent, over-tackified, (meth)acrylic adhesives generally include from 100 to 80 weight percent of a C4–C12 alkyl ester component such as, for example, isooctyl acrylate, 2-ethyl-hexyl acrylate and n-butyl acrylate, and from 0 to 20 weight percent of a polar component or cohesively reinforcing component such as, for example, acrylic acid, methacrylic acid, vinyl acetate, N-vinyl pyrrolidone, and styrene macromer. Preferably, the (meth)acrylic pressure sensitive adhesives include from 0 to 20 weight percent of acrylic acid and from 100 to 80 weight percent of isooctyl acrylate. Useful tackifiers that can be used to over-tackify these materials are rosin esters such as that commercially available from Hercules, Inc. under the trade designation "FORAL 85, " aromatic resins such as that commercially available from Hercules, Inc. under the trade designation "PICCOTEX LC-55WK," and terpene resins such as those commercially available from Arizona Chemical Co. under the trade designations "SYLVAREZ 2019" and "ZONAREZ B-100."

Latent, over-tackified, poly(alpha-olefin) adhesives, also called poly(l-alkene) adhesives, generally include either a substantially uncrosslinked polymer or a uncrosslinked polymer that may have radiation activatable functional groups grafted thereon as described in U.S. Pat. No. 5,112, 882 (Babu et al.). Tackifying materials that can be used to over-tackify such adhesives are typically resins that are miscible in the poly(alpha-olefin) polymer. Useful tackifying resins include resins derived by polymerization of C5 to C9 unsaturated hydrocarbon monomers, polyterpenes, phenol- or styrene-modified polyterpenes, and the like. Examples of such resins based on a C5 olefin fraction of this type include those commercially available from Goodyear under the trade designation "WINGTACK."

Latent, over-tackified, silicone adhesives include two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer including polydiorganosiloxane soft segments and urea terminated hard segments. The tackifying resin, which can be used to over-tackify these adhesives, include a three-dimensional silicate structure that is endcapped with trimethylsiloxy groups (OSiMe$_3$) and also contains some residual silanol functionality. Examples of tackifying resins include those commercially available from General Electric Co., Silicone Resins Division, Waterford, N.Y., under the trade designation "SR 545," and from Shin-Etsu Silicones of America, Inc., Torrance, Calif. under the trade designation "MQD-32-2." Typically, to over-tackify a silicone resin, the tackifier is present in an amount of at least about 50 wt %. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir et al.).

Another latent adhesive (although not over-tackified) is disclosed in EP 0 989 143 A1 (Rohm and Haas Co.). This adhesive is an acrylic polymer compositions with crystalline side chains and are activatable by heat. Thus, latent adhesives suitable for use in the present invention include those derived from monomers whose homopolymers have a relatively high Tg and those derived from monomers that are crystallizable, such as octadecy acrylate, stearyl acrylate, behenyl stearate, and the like.

Another latent adhesive (although not over-tackified) is an epoxy adhesive. Epoxy adhesives are the broad class of adhesives in which the reactive resin is functionalized with the oxiranyl (epoxide) group. The adhesive formulation contains one or more oxirane functional resins, optionally contains non-reactive fillers (e.g., clay, talc, glass beads, etc.), optionally contains a rubber modifier (e.g., carboxy terminated butadiene-nitrile rubber (CTBN) such as CTBN 1330x8 from B.F. Goodrich) and also contains a curative which is reactive with the oxirane group. Curatives that react with oxirane groups are well-known to those practiced in the art of epoxy adhesive and include di- and polyamines, di- and polythiols, di- and polyphenols, di- and polyanhydrides, di-and polycarboxylic acids, imidazoles, imidazolates, as well as certain metal salt that initiate cationic polymerization, etc.

In one-part epoxy adhesives, the curative is chosen such that it is insoluble under storage conditions but becomes soluble under cure conditions. Preferably, a curative is chosen such that the curing reaction is initiated by light. One such material is the diphenyliodonium hexafluorophosphate. In such a formulation, the adhesive would be stable in the dark but would cure when exposed to light. Another method by which one achieves storage stability is to print an epoxy in the absence of a catalyst and then subsequently add the catalyst as an activation aid.

Similar formulations can also be described for acrylic, urethane, phenolic, polyimide, cyanate ester, as well as a host of other structural adhesive chemistries. For example, other suitable structural or semi-structural latent adhesives can be used in imagewise printing. A "structural adhesive" is one used to bond high strength materials such as wood, composites, or metals so that the bond strength as measured by ASTM D-1002 (overlap shear) test is in excess of 6.9 MPascals (1,000 pounds per square inch). A "semi-structural adhesive" is one used to bond high strength materials such as wood, composites, or metals so that the bond strength as measured by ASTM D-1002 (overlap shear) test is in excess of 3.5 MPascals (500 pounds per square inch) up to that of a structural adhesive. Such adhesives include, for example, those disclosed in U.S. Pat. Nos. 5,721,289 (Karim et al.), which are directed to epoxy-acrylics and are activatable by heat or other forms of radiation, and EP 620 259 (George et al.), which are directed to epoxy-polyesters and are activatable by heat or other forms of radiation.

Suitable polyester and polyamide resins for use as the adhesive toner of the present invention include polyester or polyamide resins which are prepared by a condensation polymerization of an alcohol or an amine and a carboxylic acid. Specific examples of such alcohols for use in the polyester resins include glycols such as ethylene glycol, diethylene glycol, triethylene glycol and propylene glycol; 1,4-bis(hydroxymethyl)cyclohexane, etherificated bisphenols such as bisphenol A, dihydric alcohol monomers, and polyhydric alcohol monomers. Specific examples of such amines for use in the polyamide resins include polyamines such as ethylene diamine, propylene diamine, diethylenetriamine, triethylenetetramine, propylene-oxide diamines such as the Jeffamines available from Huntsman Chemical, and aromatic polyamines. Specific examples of the carboxylic acids for use in the polyester and polyamide resins include organic dibasic acid monomers such as maleic acid, fumaric acid, phthalic acid, isophthalic acid, terephthalic acid, succinic acid, malonic acid; and polybasic carboxylic acid monomers such as 1,2,4-benzenetricarboxylic acid, 1,2,5-benzenetricarboxylic acid, 1,2,4-cyclohexanetricarboxylic acid, 1,2,4-naphthalenetricarboxylic acid, 1,2,5-hexanetricarboxylic acid, 1,3-dicarboxyl-2-methylenecarboxylpropane, and 1,2,7,8-octanetetracarboxylic acid. Such latent adhesives can be activated by heat.

Preferred Plasticizer-Activatable Acylate PSA

A preferred latent adhesive useful in the present invention includes the plasticizer-activatable high Tg acrylic polymer based pressure sensitive adhesives disclosed in International Publication No. WO 00/56830 published Sep. 28, 2000 (Everaerts et al.).

Base Copolymer. The base copolymer of these preferred plasticizer-activatable pressure sensitive adhesive is low in tack or totally tack-free at room temperature (i.e., about 20° C. to about 25° C.). The base copolymer derives its low tack or no tack characteristics at room temperature from its high/or Tg and high shear storage modulus. In general, the high Tg and high modulus base copolymers have significant glassy character and are non-elastomeric in nature. The Tg of the base copolymer can be determined by either analytical methods, such as well known calorimetric or dynamic/mechanical techniques, or may be calculated based on the types and proportion of comonomers used to form the copolymer. For the purposes of the present application, the Tg of the base copolymers is calculated using the Tg of the homopolymers of each comonomer and the weight fraction of the comonomers, as shown in the following equation of Fox, T. G., Bull. Am. Phys. Soc. (Ser. 2) 1:123 (1956), $1/Tg=W_a/Tg_a+W_b/Tg_b+W_c/Tg_c$ wherein Tg, $Tg_a$, $Tg_b$ and $Tg_c$ designate the glass transition temperature (in ° K) of a terpolymer of comonomers a, b and c, a homopolymer of comonomer a, a homopolymer of comonomer b, and a homopolymer of comonomer c, respectively. $W_a$, $W_b$ and $W_c$ are the weight fractions of comonomers a, b, and c, respectively, wherein $W_a+W_b+W_c=1$.

In addition to having a Tg that is at least about 10° C., the low tack or non-tacky base copolymers of these preferred plasticizer-activatable adhesives also possess a shear storage modulus of at least $5 \times 10^5$ Pascals at 23° C. and 1 Hz. To transform the base copolymer to a material that exhibits pressure sensitive adhesive properties, the plasticizing agent should be chosen to lower the base copolymer's Tg to below about 10° C., preferably below 0° C., and its shear storage modulus to below the Dahlquist Criterion. This is also true for the over-tackified adhesives discussed above.

The high Tg comonomer not only provides mechanical properties that ultimately effect the pressure sensitive adhesive properties of the plasticized acrylate pressure sensitive adhesive composition, but also can be used to control the solubility parameter of the base copolymer and its compatibility with plasticizing agents. The high Tg comonomers of these preferred plasticizer-activatable adhesives are ethylenically unsaturated monomers, preferably monoethylenically unsaturated monomers having a homopolymer Tg greater than about 20° C., most preferably greater than about 50° C., and can be copolymerized with the low Tg (meth) acrylate monomers described below. Examples of useful high Tg comonomers include, but are not limited to, substituted lower (C1–C4) alkyl methacrylates such as, methyl methacrylate, ethyl methacrylate; vinyl esters such as vinyl acetate, vinyl pivalate; and vinyl neononanoate; N-vinyl lactams such as N-vinyl pyrrolidone; N-vinyl caprolactam; substituted (meth)acrylamides such as, N,N-dimethyl acrylamide, N-octyl acrylamide, N,N-dimethyl methacrylamide, N,N-diethyl acrylamide, and N,N-diethyl methacrylamide; (meth)acrylonitrile; maleic anhydride; acrylate and methacrylate esters of cycloalkyl; aromatic or bridged cycloalkyl alcohols such as isobornyl acrylate, isobornyl methacrylate, 4-t-butylcyclohexyl methacrylate, cyclohexyl methacrylate, phenyl acrylate, phenylmethacrylate, 2-naphthyl acrylate, and 2-naphthyl methacrylate; styrene and substituted styrene derivatives such as alpha-methyl styrene; and mixtures thereof Particularly preferred are ethyl methacrylate, methyl methacrylate, isobornyl acrylate, isobornyl methacrylate, 4-t-butyl cyclohexyl methacrylate, 4-t-butyl cyclohexyl acrylate, cyclohexyl methacrylate, N,N-dimethyl acrylamide, N,N-dimethyl methacrylamide, acrylonitrile, and mixtures thereof.

The base copolymer of these preferred plasticizer-activatable adhesives also contains one or more low Tg (meth)acrylate comonomers. The low Tg (meth)acrylate comonomers provide a means to adjust the solubility parameter, the Tg, and modulus of the base copolymer. Examples of useful low Tg (meth)acrylate comonomers include monofunctional unsaturated monomers selected from the group consisting of (meth)acrylate esters of non-tertiary alkyl alcohols, the alkyl groups of which include from about 1 to about 18, preferably about 4 to about 12 carbon atoms, and mixtures thereof. Preferred (meth) acrylate monomers, when homopolymerized, have a Tg below 20° C., preferably below 0° C. and have the following general Formula (I):

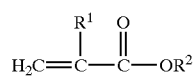

Formula (I)

wherein $R^1$ is H or $CH_3$, the latter corresponding to where the (meth)acrylate monomer is a methacrylate monomer. $R^2$ is broadly selected from linear or branched hydrocarbon groups and may contain one or more heteroatoms. The number of carbon atoms in the hydrocarbon group is preferably about 1 to about 18, and more preferably about 4 to about 12.

Examples of suitable (meth)acrylate monomers useful in the present invention include, but are not limited to, methylacrylate, ethylacrylate, n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxyethoxyethyl acrylate and mixtures thereof.

Instead of, or in addition to, lower Tg acrylates and methacrylates, lower Tg vinyl esters such as vinyl-2-ethylhexanoate, vinyl neodecanoate, and the like can also be used.

Similar to the high Tg comonomers used in the base copolymer, the optional acidic comonomers also contribute to the mechanical properties of the plasticized pressure sensitive adhesive composition. In addition, such acidic comonomers enhance internal reinforcement and substrate affinity of the resultant plasticized pressure sensitive adhesive composition. Useful acidic comonomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic :acid, itaconic acid, fumaric acid, crotonic acid, citraconic acid, maleic acid, β-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability and effectiveness in reinforcing (meth)acrylate pressure sensitive adhesives, particularly preferred acidic monomers are the ethylenically unsaturated carboxylic acids, most preferably acrylic acid, β-carboxyethyl acrylate and methacrylic acid.

The base copolymer of the plasticizer-activated adhesive preferably includes, based upon 100 parts by weight total, about 30 to about 70 parts by weight of a high Tg comonomer, about 30 to about 50 parts by weight of a low Tg (meth)acrylate comonomer, and optionally up to about 20 parts by weight of an acidic comonomer. More preferably, the base copolymer includes about 40 to about 65 parts by weight of a high Tg comonomer, about 35 to about 50 parts by weight of a low Tg (meth)acrylate comonomer, and about 2 to about 15 parts by weight of an acidic comonomer.

Crosslinking Agents. These latent pressure sensitive adhesive compositions can also include a crosslinking agent to improve the internal strength, solvent resistance, and other properties of the pressure sensitive adhesive compositions. For example, a crosslinking agent can be used to reduce cold flow, increase cohesive strength, limit coalescence of the particles, etc. The crosslinking agent is present in an amount of from about 0.05% to about 5% weight based on 100 parts of the base copolymer or based upon 100 parts by weight of the comonomers employed.

The crosslinking agents are selected according to the polymerization and coating method used. Crosslinking agents for the base copolymers prepared via photopolymerized solventless bulk methods include: multifunctional acrylates such as 1,6-hexanediol diacrylate, trimethylolpropane triacrylate, pentaerythritol tetracrylate, 1,2-ethylene glycol diacrylate, and 1,12-dodecanediol diacrylate; substituted triazines, such as 2,4-bis(trichloromethyl)-6-p-methoxystyrene-S-triazine, and the chromophore halomethyl-S-triazines; mono-ethylenically unsaturated aromatic ketones, particularly 4-acryloxybenzophenone; multifunctional crosslinking agents, such as 1,5-bis(4-benzoylbenzoxy)pentane, and 1,4-butanedi(4-benzoylphenoxy)acetate.

Crosslinking agents useful in solution, emulsion, and suspension polymerized base copolymer compositions are those which are free radically copolymerizable and/or which effect crosslinking through exposure to radiation, moisture or heat following polymerization of the base copolymer. Such crosslinkers include the above mentioned photoactive substituted triazines, multifunctional benzophenone crosslinking agents and mono-ethylenically unsaturated aromatic ketones. Hydrolyzable, free radically copolymerizable crosslinkers, such as mono-ethylenically unsaturated mono-, di- and trialkoxy silane compounds including but not limited to methacryloxypropyl trimethoxysilane (sold under the tradename "Silane A-174" by Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinkers. Heat activated copolymerizable crosslinking agents, including but not limited to N-methylol acrylamide and acrylamido glycolic acid, can also be used to enhance the shear strength of the pressure sensitive adhesive composition of the invention.

Ionic crosslinking methods can also be used. Examples of these include the simple addition of multifunctional metal ions, such as for example zirconium acetate (available from Magnesium Elektron Ltd., Flemington, N.J., USA); or the compounding with polymeric basic crosslinkers as disclosed in U.S. patent application Ser. No. 09/025,607, assigned to 3M Company.

Additives. The starting materials may include a polymerization initiator, especially a thermal initiator or a photoinitiator of a type and in an amount effective to polymerize the comonomers of the base copolymer. A free radical initiator is preferably added to aid in the copolymerization of the high Tg comonomers, low Tg (meth)acrylate comonomers and optional acidic comonomers. The type of initiator used depends on the polymerization process. Photoinitiators which are useful for polymerizing the polymerizable mixture monomers include benzoin ethers such as benzoin methyl ether or benzoin isopropyl ether, substituted benzoin ethers such as 2-methyl-2-hydroxylpropiophenone, aromatic sulfonyl chlorides such as 2-naphthalenesulfonyl chloride, and photoactive oxides such as 1-phenyl-1, 1-propanedione-2-(o-ethoxycarbonyl)oxime. An example of a commercially available photoinitiator is IRGACURE 651 (2,2-dimethoxy-1,2-diphenylethane-1-one, commercially available from Ciba-Geigy Corp.). Generally, the photoinitiator is present in an amount of about 0.005 to 1 weight percent based on the weight of the copolymerizable monomers. Examples of suitable thermal initiators include AIBN (2,2'-azobis (isobutyronitrile)), hydroperoxides, such as tert-butyl hydroperoxide, and peroxides, such as benzoyl peroxide and cyclohexane peroxide.

Optionally, the composition also includes a chain transfer agent to control the molecular weight of the base copolymer. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, pentaerythritol mercaptopropionate, 2-mercaptoimidazole, and 2-mercaptoethyl ether. The amount of chain transfer agent that is useful depends upon the desired molecular weight and the type of chain transfer agent. The chain transfer agent is typically used in amounts from about 0.001 part to about 10 parts by weight per 100 parts of the base copolymer, and preferably from about 0.01 part to about 0.5 part, and most preferably from about 0.02 part to about 0.20 part.

Other additives can be included in the polymerizable mixture or added at the time of compounding or coating to change the properties of the latent pressure sensitive adhesive of this preferred acrylate formulation, as well as the compositions of any of the latent adhesives described herein. Such additives, include pigments, fillers, hydrophobic or hydrophilic silica, calcium carbonate, glass or synthetic fibers, blowing agents, toughening agents, reinforcing agents, fire retardants, antioxidants, and stabilizers. The additives are added in amounts sufficient to obtain the desired end properties. For example, suitable fillers can prevent cold flow of the adhesive.

Polymerization Methods

In the practice of the invention, the base copolymers of the plasticizer-activatable latent pressure sensitive adhesives can be polymerized by techniques including, but not limited to, the conventional techniques of solvent polymerization, dispersion polymerization, emulsion polymerization, suspension polymerization, solventless bulk polymerization, and radiation polymerization, including processes using ultraviolet light, electron beam, and gamma radiation. These methods are disclosed in International Publication No. WO 00/56830 (published Sep. 28, 2000).

Particle formation can be occur directly from the polymerization method, or the polymer can be solvent cast, extruded, or radiation cured, for example, and then formed into a powder using mechanical techniques such as cryogrinding or hammer milling.

Limited Coalescence Polymerization Method

In certain cases it is desirable to directly form particles for use in the latent adhesive toner of the preferred size during polymerization, as opposed to using mechanical reduction processes to form particles. Using a limited coalescence polymerization method, the spherical shape of the particles can be maintained and using low temperatures, as in cryogrinding can be avoided.

The method of limited coalescence polymerization is suitable for a variety of free radically polymerized polymers, although it is described herein with respect to acrylate polymers. Typically, the polymers are polymerized in aqueous media using surfactants as stabilizers, possibly in combination with other additives providing co-stabilization of the monomer droplets. Unfortunately, the same surfactants providing stability to the suspension can also have detrimental effects on the adhesion and the stability/handling of the resulting latent particulate adhesives. For example, surfactants typically make the latent adhesive particles (and toners) more susceptible to moisture absorption causing changes in adhesive performance. This moisture sensitivity also makes electrical charging of the latent adhesive particles very erratic.

The present invention thus provides a preferred method of forming latent adhesive particles that can be polymerized in the absence of surfactants using colloidal silica as the stabilizer. In particular, using this limited coalescence polymerization process surfactant-free particles for use in the toners of the present invention can be obtained with a relatively narrow size distribution (preferably, but not necessarily, no greater than about 20%). In this process, the monomers are combined with a colloidal material, preferably colloidal silica, although other colloidal materials can be used as well, such as alumina, as the stabilizer. This reaction is typically carried out in water, such as deionized water. Also included in the reaction mixture is typically and preferably a promoter, optionally a free radical initiator, a polymerization inhibitor for the aqueous phase only, and a chain transfer agent. Examples of suitable promoters are disclosed in U.S. Pat. No. 5,238,736 (Tseng). Examples of suitable free radical initiators are listed above. A particularly preferred promoter is an amphiphilic polymer, a particularly preferred free radical initiator is one that is organic phase soluble, and a particularly preferred polymerization inhibitor is water soluble.

The pH is adjusted to reduce the amount of coagulation. Significantly and preferably, the pH of the mixture is adjusted so as to be in the range of about 3 to about 11, and more preferably, about 4 to about 6. For certain monomers, the initial pH of the mixture can be as low as 2.5. This pH may be low enough for the colloidal particles to stabilize the monomer droplet but the final product may contain a small amount of coagulum. Similar observations can be made at very high pH. It has been observed that when the sample is treated with ammonia or hydrochloric acid to about pH 4 to about 6, the reaction is more stable and the final product is basically free of coagulum.

The mixture is exposed to shearing forces, preferably high shear, to break the monomer droplets down to a diameter size of 1 micron or less. The shearing action is then reduced to a lower agitation rate (or temporarily stopped) to allow for the partial coalescence of the small droplets and formation of a suspension. The silica/promoter mixture stabilizes the droplets and limits their coalescence yielding very uniform, and sometimes nearly monodisperse particles. The suspension polymerization is completed under moderate agitation and a stable, aqueous dispersion of particles is obtained. The small and uniform particle size yields easily fluidizable powders, which can be used for toners. Particle size is controlled by the type of colloidal stabilizer used or the ratio of the stabilizer to the monomers, for example.

This polymerization technique has been successfully used to make high Tg (i.e., higher than room temperature), latent adhesive particles, free of surfactant. These particles can be crosslinked so they retain their shape even when exposed to temperatures above their Tg, or they can be free of any crosslinking so they can be fused to a continuous coating with heating. Being high in Tg, the polymer forms a non-tacky material. This polymerization technique can also be used to make semi-crystalline polymer latent adhesive particles by replacing part of the monomers with crystallizing monomers, such as octadecyl acrylate or behenyl acrylate.

To obtain a dry powder suitable for use in the toners of the present invention, one can simply filter the particles from the aqueous dispersion, wash the polymer cake with some water and air-dry the material. If the particles are dried without agitation some agglomeration may occur. However the agglomerates will typically break up with slight pressure. For softer materials (Tg closer to room temperature and/or low modulus), it may be necessary to add a low amount (e.g., less than about 1%) of an anti-caking agent, such as fumed silica or talc. If the powders are to be used as toner, some classifying through sieves may be needed, for example, to eliminate any agglomerates from forming. However, in most cases very little, if any classification is necessary. Indeed, this polymerization technique has the benefit that polymer particles coming straight out of the reactor are the desired particle size and size distribution for this application.

This method has several advantages. For example, the method yields a copolymer with a narrow distribution of particle size and limited agglomeration of the dried particles. Thus, large masses of agglomerated particles are avoided. The particles are sterically stabilized by the colloidal particles, as opposed to surfactants that are used in conventional suspension polymerization methods. Also, this method reduces or eliminates the need for extensive grinding and classification.

Magnetically Responsive Materials

For magnetic imaging processes, the latent adhesive toners of the invention preferably include one or more magnetically responsive materials to aid in positioning the toners. The term "magnetically responsive materials" as used herein refers to materials with sufficient magnetic attraction so as to be useful in the transport of the latent adhesive particles of the invention onto a transfer medium and/or substrate. Magnetically responsive materials include, but are not limited to, ferromagnetic materials, salts of ferromagnetic materials, and alloys of ferromagnetic materials, which may or may not be magnetized. For example, a ferromagnetic material may be permanently magnetized to form a magnetically responsive material, which is a permanent magnet.

Preferred magnetic materials are those that can be strongly magnetized by the magnetic field in the direction thereof and, those that are chemically stable. Typical magnetic or magnetizable materials include such metals as cobalt, iron, nickel, and the like; alloys and mixtures of such metals as aluminum, cobalt, copper, iron, magnesium, nickel, tin, zinc, antimonium, beryllium, bismuth, cadmium, calcium, manganese, selenium, titanium, tungsten, vanadium, and the like; metallic compounds including metal oxides such as aluminum oxide, iron oxide, copper oxide, nickel oxide, zinc oxide, titanium oxide, magnesium oxide, and the like; refractory nitrides such as vanadium nitride, chromium nitride, and the like; carbides such as tungsten carbide, silica carbide, and the like; and ferrites; and the mixtures thereof.

It is possible to coat the magnetically responsive materials with a material to enhance the affinity of the magnetically responsive material for the latent adhesive particles. For example, the magnetically responsive particle(s) is coated with a thermoplastic material. Useful thermoplastic materials include but are not limited to those selected from the group consisting of a dispersion of polymeric thermoplastics, such as those derived from acrylates, polyolefins, polystyrenes, and the like.

The number and size of the magnetically responsive particles contained within the latent adhesive toners can vary. The size and number of the magnetic particles, if used, are sufficient to allow for the transfer of the adhesive toner of the invention onto a transfer medium if used, and/or onto the ultimate substrate to be coated.

The desired particle size of the magnetically responsive particles depends on the imaging process. For example, an average particle size (e.g., particle diameter) of less than about 1 micron are preferred for magnetographic imaging methods (in which the magnetic particles become part of the image), whereas an average particle size of about 100 microns are preferred for electrophotographic imaging methods (in which the magnetic particles serve as carriers for the toner particles and are recycled).

The amount of magnetically responsive particles depends on the imaging process. For magnetographic imaging methods, preferably, no greater than about 10 weight percent (wt %), more preferably, no greater than about 5 wt %, and most preferably, no greater than about 2 wt % of the magnetic responsive particles are used, whereas as much as 90 wt % or more can be used for electrophotographic imaging methods.

These magnetically responsive materials can be combined with the latent adhesive particles after polymerization to form a latent adhesive toner. Preferably, however, these magnetic particles can also be incorporated into the particles during the polymerization process if desired.

Toner Additives

Aside from magnetic particles, coloring agents can be used in the latent adhesive toners as long as they do not adversely affect the adhesive characteristics of the polymer once activated. Other additives can include electric charge control agents as described in *Electrophotography and Development Physics*, Second Edition, L. B. Schein, ed., Chapter 12 (1992), flow control agents, and the like.

Charge control agents are added to control the toner charge. They have been reported to increase the rate of charging, stabilize the charge and decrease the amount of wrong sign toner. Examples of charge control agents include fumed silica and Kynar, a highly fluorinated polymeric material.

Also, if desired, the activation aid, such as a plasticizer, can be incorporated into a toner if the plasticizer is encapsulated in a way that it doesn't activate the adhesive until the toner is imagewise printed and fused to form a latent adhesive image.

Substrates

The adhesives of the present invention can adhere a wide variety of substrates together using the methods of the present invention. Examples of substrates on which the latent adhesive toner of the invention or the adhesive prepared therefrom can be coated include but are not limited to those selected from the group consisting of paper, thermoplastic films, metal, cloth, wood, fiberglass, leather, glass, porous membranes, circuit boards. Some of these can be directly imaged on, whereas some require a transfer medium to be used.

The substrate can optionally be coated with a primer material prior to coating with the latent adhesive toner of the invention or subsequent to coating with the latent adhesive toner. The latent adhesive toner can be secured to the substrate simultaneously with positioning on the substrate or subsequent to positioning on the substrate. The latent adhesive particles, which are secured to the substrate, may then be activated at a later point in time prior to use. Primer materials are those defined as having the ability to maintain the latent adhesive particles in position for a sufficient period of time to allow post activation. Examples thereof include but are not limited to those selected from the group consisting of inks, shellacs, varnishes, adhesives, low melt temperature (co)polymers, polyolefins, and waxes, such as paraffin and beeswax.

Methods of Imagewise Application of Latent Adhesive Particles

The latent adhesive toner can be applied to a substrate via a number of electrostatic processes such as electrostatographic processes (electrographic, electrophotographic, electrostatic, combinations thereof, etc.), as well as magnetic processes. Preferably, the imagewise printing process of the present invention includes electrophotographic processes and magnetic processes, more preferably, electrophotographic processes.

In general, an electrostatic charge opposite to that applied to the latent adhesive toner may be applied to the substrate and also to a transfer medium, if used, by a number of methods including but not limited to the following: brushing, conduction, corona treatment, and photoconduction. A repulsive electrical field may be generated which can aid in positioning the charged latent adhesive toner on the transfer medium, if used, and also on the substrate. The repulsive electrical field(s) can be generated by a number of methods including but not limited to the following: brushing, conduction, corona treatment, and photoconduction. The repulsive field is of sufficient magnitude and positioned such that a charged bead placed therein will be transported to the transfer medium, if used, and/or depending upon the method of application transported to the substrate. When the latent adhesive toner is electrostatically chargeable the latent adhesive particles of the toner may be positioned on a substrate by attracting and contacting the particles to the substrate by means of an electrostatic force. The electrostatic force may be applied by a wide variety of methods.

More specifically, the term "electrophotographic" recording process refers to a type of electrographic process in which a photoconductive material (i.e., photoconductor) is entirely charged with a charging device and then exposed in an imagewise fashion to light to form an electrostatic latent image thereon. The electrostatic latent image is subsequently developed with a dry toner to form a toner image on the photoconductor. The toner image (i.e., the "real" image) is transferred onto an image receiving material such as a paper sheet. This can occur by direct or indirect means. The toner image transferred on the image receiving material is then fixed (i.e., fused) upon application of heat, pressure, solvent vapor, or a combination thereof. The toner that is not transferred and is left on the photoconductor is removed by various means if necessary, and then the above process is repeated.

Although electrophotographic imagewise printing is preferred, electrostatic imagewise printing is also possible. The term "electrostatic" recording process refers to a type of electrographic process in which a recording head is utilized to impose an electrostatic pattern upon a recording medium, and in which a toner material is subsequently attracted to, and affixed to the electrostatic pattern. In a typical electrostatic imaging process, a recording head which includes a linear array of a plurality of separately chargeable electrodes, generally referred to as "nibs," is scanned across a recording medium, and the nibs are selectively energized to impose an electrostatic pattern upon the medium. The charged surface of the medium, which is typically negatively charged, is contacted with a toner. The toner is typically a liquid containing colorant particles that are typically positively charged, but can be a dry toner. Excess toner is removed from the medium, leaving toner only on the charged areas. The toner is subsequently dried or otherwise fixed to produce a permanent image. The toner system chosen must be compatible with the recording medium such that it is accepted and retained.

Electrostatic printing of media conventionally requires the printing of electrostatic images on volume-conductive or through-conductive dielectric recording media (i.e., recording media that allows electrical conductivity through the media, i.e., along the z-axis), such as a dielectric paper construction. This image can then be transferred to a polymer film. Such conventional electrostatic imaging is disclosed in U.S. Pat. No. 5,114,520 (Wang et al.). The dielectric paper construction typically comprises a paper or paper-like substrate (or bulk conductive material), a conductive layer coated on a major surface of the substrate, a dielectric layer coated over the conductive layer, and an optional release layer coated above, beneath, or with the dielectric layer to assure that the image received above the dielectric layer can be optionally transferred to the final substrate upon application of heat and pressure. Alternatively, electrostatic printing can occur directly onto non-through-conductive or x-y-plane-conductive dielectric recording media (i.e., recording media that allows electrical conductivity in the x-y plane, i.e., the major plane, of the recording media, but not along the z axis), such as polymer films. This is disclosed, for example, in U.S. Pat. No. 5,385,771 (Willetts et al.), Japanese Kokai Publication No. 3-69960, and U.S. Pat. No. 5,736,228 (Morris et al.). Such polymer films include polyester-containing films and vinyl-containing films, for example, and are referred to as direct-print films. Typically, a direct print film includes a polymeric substrate having a solvent-coated conductive layer disposed thereon and a dielectric layer coated on the conductive layer.

Magnetic imagewise printing can also be used with the latent adhesive toners described herein. When the latent adhesive toner is magnetically responsive the latent adhesive toner may be attracted to and contacted with the substrate by means of one or more magnetic forces thereby positioning the latent adhesive toner on the substrate to form a tack-free coating of the latent adhesive toner thereon. The magnetically responsive latent adhesive toner of the invention may be applied to a substrate via a magnetic process such as a magnetographic process. A magnetic field may be generated around the transfer medium, if used, and/or around the substrate depending on the nature of the latent adhesive toner and the nature of application desired. The magnetic field can be generated, for example, by a permanent magnetic and/or by an electrically induced magnetic field.

As one example, when the magnetically responsive latent adhesive toner includes permanent magnetic particle(s) the magnetic attraction force can be provided by a magnetically responsive material in the substrate (i.e., the substrate can comprise a magnetically responsive material) or a magnetically responsive material can be positioned on a side of the substrate opposite the latent adhesive toner. The latent adhesive toner is brought close to the substrate thereby allowing the magnetic force to position the latent adhesive toner on the substrate to form a tack-free coating thereon.

When a transfer medium is used, the latent adhesive toner may be activated prior to transfer to a second substrate, subsequent to transfer to a second substrate, or simultaneously with transfer to the second substrate. Thus, in one situation, the latent adhesive toner on the transfer medium may be activated to provide a coating of adhesive on the transfer medium. The adhesive is then transferred to a second substrate to provide a coating of adhesive on the second substrate.

It is also envisioned that a second substrate which has been optionally charged with an electrostatic charge opposite to that on the latent adhesive toner can be brought close to the latent adhesive toner on a first substrate. The latent adhesive toner can then be allowed or caused to contact the second substrate and form a tack-free coating on the second substrate by various methods depending on the force holding the latent adhesive toner to the first substrate. This may involve one or more of the following: removing the optional charge from the first substrate; removing the repulsive electrical field keeping the latent adhesive toner in contact with the first substrate; applying an electrical force repulsive to the latent adhesive toner on a side of the first substrate opposite the latent adhesive toner; providing the second substrate with an electrostatic charge greater than that that has optionally been applied to the first substrate. The latent adhesive toner can subsequently be activated after transfer to the second substrate so as to convert the latent adhesive particles and form an adhesive on the second substrate.

When magnetics are involved in holding the latent adhesive toner to the substrate, one can bring a second substrate, which optionally has encompassing therearound a magnetic field, into contact with the latent adhesive toner on a first substrate, simultaneously activating the latent adhesive toner so as to convert the latent adhesive particles and provide a layer of an adhesive on the second substrate. In another situation when magnetics are involved, one can bring a second substrate, which optionally has encompassing therearound a magnetic field of greater magnitude than that around a first substrate, close to the latent adhesive toner on the first substrate, so that the latent adhesive toner contacts the second substrate due to the stronger magnetic forces. This results in a tack-free coating of the latent adhesive toner on the second substrate. This can be followed by the subsequent step of activating the latent adhesive toner so as to convert the latent adhesive particles and provide an imagewise coating of an adhesive on the second substrate.

Examples of transfer media for electrostatic processes include but are not limited to those materials that will induce an electrical charge and hold the charge for a working period (insulators). Examples thereof include but are not limited to those materials selected from the group consisting of thermoplastics, wood, paper, impregnated cloth such as epoxy siliconized cloth, rubberized cloth, etc. Useful transfer media for magnetic processes include but are not limited to those that allow the passage of a magnetic field therethrough or those that may be magnetized themselves. The transfer medium can take the form of a thin metallic film, drum, roll, metallized film, cloth, metallized cloth, etc.

Activation Aids and Methods of Activating Adhesives

The methods described herein include the use of an activation aid to activate the latent adhesive image. The activation aid is used to activate the adhesive to adhere, for example, two substrates together. Activation aids include, for example, the application of heat or other forms of radiation (e.g., infrared radiation), the application of a plasticizer, water, organic solvent, catalysts (for materials such as epoxies), and the like. Any compound or input of energy that will convert the latent adhesive, preferably, latent pressure sensitive adhesive to an adhesive that can adhere to substrates together is suitable for use as an activation aid according to the present invention.

Preferably, the activation aid includes a plasticizer (i.e., plasticizing agent). Suitable plasticizers that could be used to activate the adhesive include, for example, plasticizing agents selected for use with the polymerizable base copolymer compositions. Generally, the plasticizing agents can be liquid or solid, have a range of molecular weights and architectures, and are compatible with the latent adhesive. They can be monomeric or polymeric, volatile or non-volatile, reactive or non-reactive. Additionally, mixtures of plasticizing agents can be used in the present invention.

Generally, liquid plasticizing agents are readily combinable with the latent adhesive. Although somewhat more challenging to use, solid plasticizing agents can advantageously be used in applications, processes or articles where the controlled plasticization of the latent adhesive image is desired. Once heated to the melting or glass transition temperature of the solid plasticizing agent, the latent adhesive is plasticized and the mixture exhibits pressure sensitive adhesive properties.

Additionally, the plasticizing agents can have a range of molecular weights and architectures. That is, the plasticizing agents can be either polymeric or monomeric in nature. Typically, monomeric plasticizing agents are derived from low molecular weight acids or alcohols, which are then esterified with respectively a monofunctional alcohol or monofunctional acid. Useful polymeric plasticizing agents are typically derived from cationically or free-radically polymerizable, condensation polymerizable, or ring-opening polymerizable monomers to make low molecular weight polymers.

Useful plasticizing agents are compatible with the latent adhesive, such that once the plasticizing agent is diffused into the latent adhesive, the plasticizing agent does not phase separate from the latent adhesive. By "phase separation" or "phase separate," it is meant that by differential scanning calorimetry (DSC) no detectable thermal transition, such as a melting or glass transition temperature can be found for the pure plasticizing agent in the plasticized adhesive composition. Some migration of the plasticizing agent from or throughout the plasticized adhesive can be tolerated, such as minor separation due to composition equilibrium or temperature influences, but the plasticizing agent does not migrate to the extent that phase separation occurs between the latent adhesive and the plasticizing agent. When polymeric plasticizing agents are used, they tend to be a bit more limited in their applications than monomeric plasticizing agents and, in general, the lower the molecular weight of the polymeric plasticizing agent, the higher their compatibility with the latent adhesive, and higher diffusiveness into the latent adhesive. Plasticizing agent compatibility with the latent adhesive can also be dependent upon the chemical nature of the plasticizing agent and the monomeric content of the latent adhesive. For example, polymeric plasticizing agents based on polyether backbones (such as polyethylene glycols) are observed to be more compatible than polyester plasticizing agents, especially when higher levels of acidic comonomer are used.

Suitable plasticizing agents are preferably non-volatile such that they remain present and stable in the plasticized adhesive. The presence of the plasticizing agent in the plasticized adhesive compositions operates to maintain adhesion properties of the adhesive compositions. However, if transient adhesion is desired, a volatile plasticizer can be used.

Additionally, useful plasticizing agents can be reactive or non-reactive. Preferably, they are non-reactive. Plasticizing agents having acrylate functionality, methacrylate functionality, styrene functionality, or other ethylenically unsaturated, free radically reactive functional groups are generally will generally be reactive in the presence of the latent adhesive. Such plasticizers include acrylated polyesters and acrylated urethanes.

Examples of preferred plasticizing agents include polyalkylene oxides having weight average molecular weights of about 150 to about 5,000, preferably of about 150 to about 1,500, such as polyethylene oxides, polypropylene oxides, polyethylene glycols; alkyl or aryl functionalized polyalkylene oxides, such as that commercially available from ICI Chemicals under the trade designation "PYCAL 94" (a phenyl ether of polyethylene oxide); benzoyl functionalized polyethers, such as that commercially available from Velsicol Chemicals under the trade designation "BENZOFLEX 400" (polypropylene glycol dibenzoate); monomethyl ethers of polyethylene oxides; monomeric adipates such as dioctyl adipate, dibutyl adipate, dibutoxyethoxyethyl adipate, and dibutoxypropoxypropyl adipate; polymeric adipates such as polyester adipates; citrates such as acetyltri-n-butyl citrate; phthalates such as butyl benzylphthalates, dibutyl phthalate, diisoctyl phthalate; trimellitates; sebacates such as dibutylsebacate; myristates such as isopropyl myristate; polyesters such as those commercially available from C.P. Hall Co. under the trade designation "PARAPLEX"; phosphate esters such as those commercially available from Monsanto under the trade designation "SANTICIZER" (e.g., 2-ethylhexyl diphenylphosphate and t-butylphenyl diphenylphosphate); glutarates such as that commercially available form C.P. Hall Co. under the trade designation "PLASTHALL 7050" (a dialkyl diether glutarate); oils such as mineral oil; other polymeric plasticizing agents such as polyurethanes, polyureas, polyvinylethers, polyethers, polyacrylates; and mixtures thereof.

The amount of plasticizing agent or other activation aid used depends upon the desired level of tack in the resultant activated adhesive (i.e., the plasticized adhesive), the level of peel and shear strength desired, and the level of permanence desired. For example, as the modulus of a latent pressure sensitive adhesive increases, higher levels of plasticizing agent are necessary to bring the compounded adhesive modulus down into the useful range for pressure sensitive bond making (i.e., the shear storage modulus is below the Dahlquist Criterion). As the amount of plasticizing agent in the pressure sensitive adhesive is increased, maintaining cohesive strength becomes increasingly difficult, thus creating a practical upper limit on the amount of plasticizing agent that can be tolerated in the final pressure sensitive adhesive. High levels of plasticizing agent may be beneficial if properties such as aggressive tack, low temperature performance, or smooth peel are required. Considering practical constraints for pressure sensitive adhesive formulation, it should be clear that there is also an upper limit for the shear modulus of the latent adhesive to begin with and still enable pressure sensitive behavior with plasticizing agent loadings of 100 pph or less. Actual modulus values are difficult to define as it strongly depends on the type of plasticizing agent, plasticizing efficiency, and the compatibility of the plasticizing agent with the latent adhesive.

Any conventional technique can be used to apply the plasticizer or other activation aid to the latent adhesive image. For example, a plasticizer can be applied in solid or liquid form. It can be optionally encapsulated and applied in an imagewise fashion using the same or similar techniques as used to imagewise print the latent adhesive toner. If a liquid plasticizing agent is used, it can be applied by means of spray, flood, brush, roll, spread, wire, gravure, transfer roll, air knife, doctor blade coating, or other liquid delivery techniques (such as ink jet) to the areas of the latent adhesive image. If a solid, powdered plasticizing agent is used, it can be applied by means of conventional powder coating techniques. Solid, powdered plasticizing agents can be prepared using mechanical techniques such as cryo-grinding or hammer milling. The powder coating is then typically exposed to sufficient heat to melt the plasticizing agent, allowing it to absorb into and modify the Tg and shear storage modulus of the latent adhesive to form a pressure sensitive adhesive material. The heat source can be diffuse so to activate broad areas of the latent adhesive image or focused to activate on discrete, predetermined portions thereof.

EXAMPLES

This invention is further illustrated by the following examples that are not intended to limit the scope of the invention. In the examples, all parts, ratios and percentages are by weight unless otherwise indicated.

| Abbreviation | Description |
|---|---|
| AA | Acrylic Acid |
| BA | n-Butyl acrylate |
| BHA | Behenyl acrylate |
| $CBr_4$ | Carbon tetrabromide |
| DM070C | Magnetic carrier, copper zinc ferrite commercially available from Powder Tech, Valparaiso, IN |
| DT060 | Magnetic carrier, copper zinc ferrite commercially available from Powder Tech, Valparaiso, IN |
| EHA | 2-ethylhexyl acrylate |
| HDDA | Hexanediol diacrylate |
| IBA | Isobornyl acrylate |
| IGEPAL CA-897 | Octylphenoxypoly(ethyleneoxy)ethanol nonionic surfactant commercially available from Rhone Poulenc |
| IOTG | Isooctyl thioglycolate |

Table of Abbreviations

-continued

Table of Abbreviations

| Abbreviation | Description |
| --- | --- |
| Ludox TM-50 | 50% by weight colloidal silica in water commercially available from Aldrich, Milwaukee, WI |
| MAA | Methacrylic acid |
| MMA | Methyl methacrylate |
| NOAm | N-Octyl acrylamide |
| ODA | Octadecyl acrylate |
| PDC | Potassium dichromate |
| PPS | Potassium persulfate |
| Promoter | 50% by weight diethanol amine-adipic acid condensate in water as described in U.S. Pat. No. 5,238,736, column 10 |
| RX200 | Silica from Degussa |
| SANTICIZER 141 | 2-ethylhexyl diphenylphosphate, commercially available from Solutia; Laguna Hills, CA |
| SCOTCHKOTE 413 | Commercially available epoxy powder from 3M Company; St. Paul, MN |
| SIPONATE DS-10 | Sodium dodecyl benzene sulfonate surfactant commercially available from Alcolac Co. |
| THFA | Tetrahydrofurfuryl acrylate |
| VAZO 64 | azo-bis(isobutyronitrile) initiator, commercially available from E.I. duPont de Nemours & Co.; Wilmington, Delaware |

Test Methods

T-peel

T-peel samples were prepared by cutting 12.5 millimeter wide by 250 millimeter long samples of the adhesive coated on the liner and heat-laminating the adhesive side at about 100° C. to a 150 micrometer thick and 19 millimeter wide anodized aluminum strip. In a second step, the liner was removed and the test sample was laminated at about 100° C. to a second aluminum strip, resulting in a T-peel ready sample with the adhesive between the two aluminum strips. The samples were allowed to cool to room temperature and tested in a Sintech tensile tester (available from NTS Corporation) by clamping the aluminum strips in the jaws of the tester and separating them at a speed of 300 millimeters per minute.

Plasticizer Activation

To test the ability of the tack-free coating to become tacky upon addition of plasticizer, a sample of the tack-free coating was laid flat on a surface. A cotton swab was dipped into the plasticizer and the excess was removed so that the cotton was saturated. The plasticizer was applied to the coating via the cotton swab and allowed to penetrate at room temperature. Samples passed the plasticizer activation test if they became tacky and remained tacky for 24 hours, also a qualitative level of finger tack, either "high tack" or "low tack" is listed for each test. The plasticizer used for each test was "SANTICIZER 141" unless otherwise noted.

Heat Bondability

To test the samples for heat bondability, a sample of the powder was put between 2 glass microscope slides, the slides are pressed together with a gap of 0.5 to 1.0 millimeters and heated with a heat gun to at least partially fuse the particles. Samples passed the heat bondability test if the slides, when allowed to cool to room temperature, could not be separated by sliding the glass pieces in opposite directions or peeling them apart. Typically the glass breaks when the slides are forced apart. The data are presented as "Pass" or "Fail".

Example 1

In a vessel was mixed 240 parts by weight of a mixture of 40% EHA, 55 % MMA and 5% MAA; 6.9 parts by weight of Ludox TM-50; 360 parts by weight of deionized water; 0.42 part by weight of Promoter; and 0.08 part by weight of PDC. The pH was measured and adjusted to between 4 and 5 by the addition of IN ammonium hydroxide solution. The aqueous solution was stirred at 22,000 rpm in a Warring blender for 6 minutes. The mixture is placed in a reactor equipped with a mechanical stirrer, a condenser, and a nitrogen inlet and 0.36 part by weight of VAZO 64 was added. The temperature was raised to 70° C. while stirring at 300 rpm for 4 hours. The suspension was then allowed to cool to room temperature and filtered through cheese cloth, washed with water to remove the PDC and allowed to air dry. The mean particle size was determined on a Coulter LS particle analyzer (from Coulter Corporation, Miami, FL) and is shown in Table 1.

Example 2

The same procedure described in Example 1 was followed with a monomer mixture of 37% EHA, 58% MMA, and 5% THFA.

Example 3

The same procedure described in Example 1 was followed with a monomer mixture of 35% EHA, 55% MMA, and 10% NOAm except that the pH was adjusted with 1N HCl. The mean particle size was determined on a Coulter LS particle analyzer and is shown in Table 1.

Example 4

The same procedure described in Example 1 was followed with a monomer mixture of 45% EHA and 55% MMA except that the pH was adjusted with 1N HCl. The mean particle size was determined on a Coulter LS particle analyzer and is shown in Table 1.

Example 5

The same procedure described in Example 1 was followed with a monomer mixture of EHA 40%, MMA 55% and AA 5%. The mean particle size was determined on a Coulter LS particle analyzer and is shown in Table 1.

Example 6

The same procedure described in Example 1 was followed with a monomer mixture of EHA 40%, IBA 55% and MAA 5%. The mean particle size was determined on a Coulter LS particle analyzer and is shown in Table 1.

Example 7

The same procedure described in Example 1 was followed with a monomer mixture of BA 35%, IBA 55% and AA 10%. The mean particle size was determined on a Coulter LS particle analyzer and is shown in Table 1.

Example 8

The same procedure described in Example 1 was followed with a monomer mixture of BA 35%, IBA 55% and MAA 10%. The mean particle size was determined on a Coulter LS particle analyzer and is shown in Table 1.

TABLE 1

| Example | Mean Particle Size (micrometers) |
| --- | --- |
| 1 | 11.8 |
| 3 | 12.3 |
| 4 | 16.5 |
| 5 | 15.1 |
| 6 | |
| 7 | 17.3 |
| 8 | 12.1 |

Examples 9–11

The same procedure described in Example 1 was followed except that after the polymerization was completed the pH of the aqueous dispersion was set to 4 (Example 9), 7 (Example 10), and 10 (Example 11) through the use of IN sodium hydroxide. The particles were filtered through cheese cloth and washed with de-ionized water to remove the excess of PDC and any remaining base. The mean particle size was 11.8 microns.

Example 12

The same procedure described in Example I was followed with a monomer mixture of EHA 35%, MMA 55% and MAA 10%. In addition, 0.3 parts of IOTG per one hundred parts of monomers was added.

Example 13

The same procedure described in Example 1 was followed with a monomer mixture of EHA 20% and ODA 80% with the exception that the temperature was raised to 60° C. instead of 70° C. and the pH was adjusted with 1N HCI.

Example 14

The same procedure described in Example 1 was followed with a monomer mixture of EHA 20%, ODA 78% and AA 2% with the exception that the temperature was raised to 60° C. instead of 70° C.

Example 15

The same procedure described in Example 1 was followed with a monomer mixture of EHA 30% and BHA 70% with the modification that the BHA was added in the molten state (approximately 50° C.), the pH was adjusted using 1N HCI, and the aqueous solution of all components except the VAZO 64 was preheated to about 50° C. and after addition of the VAZO 64, the temperature was raised to 60° C. instead of 70° C.

Example 16

The same procedure described in Example 1 was followed with a monomer mixture of EHA 30% and BHA 70% with the modifications that 0.3 parts of $CBr_4$ per one hundred parts of monomers was added to the monomer mixture, the BHA was added in the molten state (approximately 50° C.), the pH was adjusted with 1N HCl, and the aqueous solution of all components except the VAZO 64 was preheated to about 50° C. and after addition of the VAZO 64, the temperature was raised to 60° C. instead of 70° C.

Example 17

The same procedure described in Example 1 was followed with a monomer mixture of EHA 20% and BHA 80% with the modification that the BHA was added in the molten state (approximately 50° C.), the pH was. adjusted with 1N HCI, and the aqueous solution of all components except the VAZO 64 was preheated to about 50° C. and after addition of the VAZO 64, the temperature was raised to 60° C. instead of 70° C.

Example 18

The same procedure described in Example 1 was followed with a monomer mixture of EHA 20%, BHA 78%, and 2% AA with the modification that the BHA was added in the molten state (approximately 50° C.) and the aqueous solution of all components except the VAZO 64 was preheated to about 50° C. and after addition of the VAZO 64, the temperature was raised to 60° C. instead of 70° C.

Example 19

The same procedure described in Example 1 was followed with a monomer mixture of EHA 20%, BHA 78%, and 2% AA with the modifications that 0.3 parts of $CBr_4$ per one hundred parts of monomers was added to the monomer mixture, the BHA was added in the molten state (approximately 50° C.), and the aqueous solution of all components except the VAZO 64 was preheated to about 50° C. and after addition of the VAZO 64, the temperature was raised to 60° C. instead of 70° C.

Example 20

The dried particles prepared in Examples 1–4 and 9–19 were mixed with DT060 in the ratio of 4 parts by weight of particles to 96 parts by weight of DT060. The charge of the particle/carrier mixture, also called the developer was measured in a T-100 triboelectric tester (available Vertex Image Products, Yukon, Pa.). The charge of the particles is shown in Table 2. In addition, coatings of the dried particles of Examples 1, 5–8 and 12 were tested for plasticizer activation using the Plasticizer Activation test described above and samples of the powders of Examples 12 and 15–19 were tested for heat bondability using the Heat Bondability test described above.

TABLE 2

| Example | Tribocharge ($\mu$C/g) | Plasticizer Activation Test | Heat Bondability Test |
| --- | --- | --- | --- |
| 1 | −16 | Low Tack | Not Tested |
| 2 | −18 | Not Tested | Not Tested |
| 3 | −33 | Not Tested | Not Tested |
| 4 | −23 | Not Tested | Not Tested |
| 5 | Not Tested | Low Tack | Not Tested |
| 6 | Not Tested | High Tack | Not Tested |
| 7 | Not Tested | High Tack | Not Tested |
| 8 | Not Tested | High Tack | Not Tested |
| 9 | −25 | Not Tested | Not Tested |
| 10 | −27 | Not Tested | Not Tested |
| 11 | −17 | Not Tested | Not Tested |
| 12 | −19 | Low Tack | Pass |
| 13 | −7 | Not Tested | Not Tested |
| 14 | −15 | Not Tested | Not Tested |
| 15 | −15 | Not Tested | Pass |
| 16 | −23 | Not Tested | Pass |
| 17 | −11 | Not Tested | Pass |
| 18 | −14 | Not Tested | Pass |
| 19 | −16 | Not Tested | Pass |

Example 21

The charged particles from Example 20 were printed on a primed polyester or vinyl film using electromagnetic brush based printing equipment such as those available from Xeikon, Wood Dale, Ill. Using one of the magnetic brush development stations, charged particles were electrostatically applied to the web and heated with a non-contact fuser to make the particles permanently adhere to the web and to facilitate their coalescence. The fuser temperature setting is controlled by the instrument such that the heat does not distort the web used. The printed webs were examined for print quality and rated either acceptable or unacceptable by examining the printed area for uniform coverage with a magnifying glass. The results are shown in Table 3.

TABLE 3

| Example | Print Quality |
| --- | --- |
| 1 | Acceptable |
| 2 | Acceptable |
| 3 | Acceptable |
| 4 | Acceptable |
| 9 | Acceptable |
| 10 | Acceptable |
| 11 | Acceptable |
| 12 | Acceptable |
| 13 | Acceptable |
| 14 | Acceptable |
| 15 | Acceptable |
| 16 | Acceptable |
| 17 | Acceptable |
| 18 | Acceptable |
| 19 | Acceptable |

Example 22

A sample of the particles prepared in Example 12 was dissolved at 40% solids in ethyl acetate to form a master solution. The master solution was divided into 4 smaller samples and mixed with SANTICIZER 141 in the amounts shown in Table 4 by tumbling the samples overnight. Using a knife coater, samples were cast on a siliconized polyester liner and dried for 15 minutes at 70° C. A dry coating thickness of about 30 microns was obtained. T-peel samples were prepared and run as described above, the data are shown in Table 4.

TABLE 4

| Example | SANTICIZER 141 level added (parts per hundred parts of polymer) | Average T-peel force (N/dm) |
| --- | --- | --- |
| 22A | 30 | 47.72 |
| 22B | 40 | 62.32 |
| 22C | 50 | 74.73 |
| 22D | 60 | 53.31 |

Example 23

In a reaction vessel fitted with a mechanical stirrer, condenser and nitrogen inlet was placed 560 parts of de-ionized water, 2.6 parts of SIPONATE DS-10 and 1.6 parts of IGEPAL CA-897. This solution was stirred at 200 rpm and bubbled with nitrogen. A mixture of 43.8 parts of IOA, 8.76 parts of AA, 52.56 parts of MMA, 70.08 parts of IBA, 0.18 parts of HDDA and 0.26 parts of $CBr_4$ was added to the stirred solution. The resulting mixture was heated to 60° C., 0.64 parts of PPS initiator was added and the resulting mixture was stirred at 60° C. for 1.5 hours and 75° C. for 4 hours. The latex was cooled to room temperature and filtered. Dry powder was obtained by drying the latex using a Buchi B-191 Mini Spray Dryer with an inlet temperature of 120° C., pump speed setting of 100%, outlet temperature of 40° C., aspirator setting of 100% and pressurized air flow of 550 liters/hour. Dry powder was obtained with a median particle size of 15–25 micrometers. The dried particles were mixed with DT060 or DM070C in the ratio of 4 parts by weight of particles to 96 parts by weight of DT060 or DM070C. Additionally, some samples also had RX200 added. The charge of the particle/carrier mixture, also called the developer was measured in a T-100 triboelectric tester (available Vertex Image Products, Yukon, Pa.). The sample descriptions and the charges of the particles are shown in Table 5.

TABLE 5

| Example | Carrier | RX200 Level (parts per 100 parts powder + carrier) | Tribocharge ($\mu C/g$) |
| --- | --- | --- | --- |
| 23A | DT060 | 0 | 7 |
| 23B | DM070C | 0 | −7 |
| 23C | DM070C | 3.5 | −38 |
| 23D | DM070C | 1.5 | −49 |
| 23E | DM070C | 0.75 | −50 |
| 23F | DM070C | 0.5 | Not measured |

Example 24

The charged particles from Example 23F were printed on a primed polyester or vinyl film using electromagnetic brush based printing equipment such as those available from Xeikon, Wood Dale, Ill. Using one of the, magnetic brush development stations, charged particles were electrostatically applied to the web and heated with a non-contact fuser to make the particles permanently adhere to the web and to facilitate their coalescence. The fuser temperature setting is controlled by the instrument such that the heat does not distort the web used. The printed web was examined for print quality and rated either acceptable or unacceptable by examining the printed area for uniform coverage with a magnifying glass and found to have acceptable print quality.

Example 25

Particles of SCOTCHKOTE 413 were mixed with DT060 or DM070C in the ratio of 4 parts by weight of particles to 96 parts by weight of DT060 or DM070C. The charge of the particle/carrier mixture, also called the developer, was measured in a T-100 triboelectric tester (available Vertex Image Products, Yukon, Pa.). The sample descriptions and the charges of the particles are shown in Table 6.

TABLE 6

| Example | Carrier | Tribocharge ($\mu C/g$) |
| --- | --- | --- |
| 25A | DT060 | −13 |
| 25B | DM070C | −20 |

Various modifications and alterations of this invention will become apparent to those skilled in the art without departing from the scope and principles of this invention, and it should be understood that this invention is not to be unduly limited to the illustrative embodiments set forth hereinabove. All publications, patent documents, and patents are incorporated herein by reference to the same extent as if each individual publication or patent was specifically and individually indicated to be incorporated by reference.

What is claimed is:

1. A method of applying an adhesive to a substrate in an imagewise fashion; the method comprising:
    providing a substrate having a latent adhesive image thereon; and
    applying a plasticizing agent to activate the latent adhesive image to form an adhesive image.

2. The method of claim 1 wherein providing a substrate having a latent adhesive image thereon comprises:
    providing a substrate;
    applying a latent adhesive toner in an imagewise fashion to the substrate; and
    fusing the latent adhesive toner to the first substrate to form a latent adhesive image.

3. The method of claim 2 wherein the latent adhesive further comprises one or more of an initiator, at least one chain transfer agent, and at least one crosslinking agent.

4. The method of claim 2 wherein applying a latent adhesive toner. comprises applying the toner in an electrophotographic process, a magnetic process, or an electrostatic process.

5. The method of claim 4 wherein applying a latent adhesive toner comprises applying the toner in an electrophotographic process or a magnetic process.

6. The method of claim 4 wherein applying a latent adhesive toner comprises applying the toner in an electrophotographic process.

7. The method of claim 2 wherein the latent adhesive toner comprises latent adhesive particles comprising a latent, over-tackified, pressure sensitive adhesive.

8. The method of claim 7 wherein the latent over-tackified pressure sensitive adhesive comprises a natural rubber, synthetic rubber, styrene block copolymer, (meth)acrylic, poly(alpha-olefin), or silicone.

9. The method of claim 2 wherein the latent adhesive toner comprises latent adhesive particles having a number average particle size of about 5 microns to about 25 microns.

10. The method of claim 2 wherein the latent adhesive toner comprises latent adhesive particles comprising a latent pressure sensitive adhesive comprising a copolymer having a Tg greater than about 10° C. which is formed from components comprises:
    about 50 wt % to about 70 wt m% of a high Tg comonomer component, wherein the homopolymer formed from the high Tg comonomer component has a Tg of at least about 20° C.;
    optionally, up to about 20 wt % based on the total weight of the base copolymer of an acidic comonomer; and
    about 30 wt % to about 50 wt % of one or more low Tg (meth)acrylate comonomer, wherein the Tg of the homopolymer of the low Tg comonomer is less than about 20° C., and.

11. The method of claim 10 wherein the high Tg comonomer component is an ethylenically unsaturated monomer or mixture thereof.

12. The method of claim 10 wherein the high Tg comonomer component is selected from the group consisting of lower alkyl (C1–C4) methacrylates, vinyl esters, N-vinyl lactams, substituted (meth)acrylamides, maleic anhydride, (meth)acrylate esters of cycloalkyl, aromatic or bridged cycloalkyl alcohols, styrene, substituted styrene or mixtures thereof.

13. The method of claim 10 wherein the high Tg comonomer component is selected from the ethyl methacrylate, methyl methacrylate, isobornyl acrylate, isobornyl methacrylate, 4-t-butyl cyclohexyl methacrylate, 4-t-butyl cyclohexyl acrylate, cyclohexyl methacrylate, N,N-dimethyl acrylamide, N,N-dimethyl methacrylamide, acrylonitrile, and mixtures thereof.

14. The method of claim 10 wherein the low Tg (meth)acrylate comonomer is a monofunctional unsaturated monomer.

15. The method of claim 10 wherein the monofunctional unsaturated monomer is a (meth)acrylate ester of non-tertiary alkyl alcohols, the alkyl group of which comprise from 1 to about 18 carbon atoms; and mixtures of (meth) acrylate esters of non-tertiary alcohols.

16. The method of claim 10 wherein the (meth)acrylate monomer, when homopolymerized has a Tg below 20° C. and has the general formula:

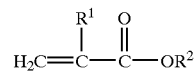

wherein $R^1$ is H or $CH_3$, the latter corresponding to where the (meth)acrylate monomer is a methacrylate monomer and $R^2$ is selected from linear or branched hydrocarbon groups and may contain one or more heteroatoms and the number of carbon atoms in the hydrocarbon group is 1 to about 18.

17. The method of claim 16 wherein the (meth)acrylate monomers are selected from the group consisting of n-butyl acrylate, ethoxyethoxyethyl acrylate, 2-ethylhexyl acrylate, isooctyl acrylate, lauryl acrylate, and mixtures thereof.

18. The method of claim 10 wherein the acidic comonomer is ethylenically unsaturated carboxylic acid, ethylenically unsaturated sulfonic acid, ethylenically unsaturated phosphonic acid and mixtures thereof.

19. The method of claim 18 wherein the acidic comonomer is acrylic acid, β-carboxyethyl acrylate and methacrylic acid.

20. The method of claim 1 wherein the plasticizing agent is non-volatile.

21. The method of claim 1 wherein the plasticizing agent is non-reactive.

22. The method of claim 21 wherein the plasticizing agent is selected from the group consisting of polyalkylene oxides having weight average molecular weights of about 150 to about 5,000; alkyl or aryl functionalized polyalkylene oxides; benzoyl functionalized polyethers; monomethyl ethers of polethylene oxides; monomeric adipates; polymeric adipates; citrates; phthalates; phosphate esters; glutarates; and mixtures thereof.

23. The method of claim 1 wherein the plasticizing agent is an ester of a mono- or multibasic acid.

24. The method of claim 1 wherein the plasticizing agent is a polyurethane, polyurea, polyvinylether, polyether, polyester, polyacrylate, or mixtures thereof.

25. A method of adhering substrates together using an adhesive printed in an imagewise fashion; the method comprising:
    applying a latent adhesive toner in an imagewise fashion to a first substrate, wherein the latent adhesive toner comprises single-composition latent adhesive particles;
    fusing the latent adhesive toner to the first substrate to form a latent adhesive image;
    activating the latent adhesive image to form an adhesive image; and
    applying a second substrate to the adhesive image disposed on the first substrate.

26. The method of claim 25 wherein the latent adhesive toner comprises latent adhesive particles comprising an acrylic, urethane, phenolic, polyimide, cyanate ester, or epoxy.

27. The method of claim 25 wherein the latent adhesive toner comprises latent adhesive particles comprising an acrylic polymer with crystalline side chains.

28. The method of claim 25 wherein the latent adhesive toner comprises latent adhesive particles comprising an epoxy acrylic or epoxy polyester structural or semi-structural adhesive.

29. The method of claim 25 wherein the latent adhesive toner comprises latent adhesive particles comprising a polyester or polyamide adhesive.

30. The method of claim 25 wherein the latent adhesive particles have a number average particle size of about 5 microns to about 25 microns.

31. A method of adhering substrates together using an adhesive printed in an imagewise fashion; the method comprising:

applying a latent adhesive toner in an imagewise fashion to a first substrate, wherein the latent adhesive toner comprises structural or semi-structural latent adhesive particles;

fusing the latent adhesive toner to the first substrate to form a latent adhesive image;

activating the latent adhesive image to form an adhesive image; and applying a second substrate to the adhesive image disposed on the first substrate.

32. The method of claim 31 wherein the latent adhesive particles have a number average particle size of about 5 microns to about 25 microns.

\* \* \* \* \*

UNITED STATES PATENT AND TRADEMARK OFFICE
CERTIFICATE OF CORRECTION

PATENT NO.   : 6,509,128 B1
DATED        : January 21, 2003
INVENTOR(S)  : Everaerts, Albert I.

It is certified that error appears in the above-identified patent and that said Letters Patent is hereby corrected as shown below:

Title page,
Item [56], References Cited, OTHER PUBLICATIONS,
"Database WPI, Section CH, Week 199104" reference, insert -- Class A03 -- prior to "An 1991"; insert -- 7 -- following "XP00217168";
"Database WPI, Section CH, Week 198351" reference, insert -- Class A04 -- prior to "An 1983";
"Binda et al.," reference, insert -- Powder -- prior to "Coating";

Column 1,
Line 19, delete "." following "electronic";
Line 33, delete "Theological", insert in place thereof -- rheological --;

Column 3,
Line 54, delete "an", insert in place thereof -- a --;

Column 4,
Line 65, delete "have", insert in place thereof -- having --;

Column 5,
Line 64, delete "." following "For";

Column 6,
Line 41, delete "comonomer", insert in place thereof -- comonomers --;

Column 7,
Line 36, delete "olefms", insert in place thereof -- olefins --;

Column 8,
Line 42, delete "a" following "of";

Column 9,
Line 11, delete "compositions", insert in place thereof -- composition --;
Line 12, delete "are", insert in place thereof -- is --;
Line 16, delete "octadecy" insert in place thereof -- octadecyl --;
Line 31, delete "di-and", insert in place thereof -- di- and --;
Line 32, delete "salt", insert in place thereof -- salts --;

Column 10,
Line 29, delete "adhesive", insert in place thereof -- adhesives --;
Line 63, delete "effect" insert in place thereof -- affect --;

UNITED STATES PATENT AND TRADEMARK OFFICE
CERTIFICATE OF CORRECTION

PATENT NO.    : 6,509,128 B1
DATED         : January 21, 2003
INVENTOR(S)   : Everaerts, Alert I.

It is certified that error appears in the above-identified patent and that said Letters Patent is hereby corrected as shown below:

Column 11,
Line 22, insert -- . -- following "thereof";

Column 12,
Line 12, delete ":" preceding "acid";
Line 60, delete "effect" insert in place thereof -- affect --;

Column 13,
Line 64, delete "," following "additives";

Column 14,
Line 15, delete "be" following "can";

Column 17,
Line 19, insert -- and -- preceding "circuit";

Column 21,
Lines 29 and 30, delete "are generally" preceding "will";
Line 56, delete "form" insert in place thereof -- from --;

Column 22,
Line 39, insert -- as -- following "so";

Column 24,
Line 4, delete "IN", insert in place thereof -- 1N --;
Line 5, delete "Warring", insert in place thereof -- Waring --;
Line 29, delete "HCI", insert in place thereof -- HCl --
Line 37, delete "HCI", insert in place thereof -- HCl --

Column 25,
Line 18, delete "IN", insert in place thereof -- 1N --;
Line 35, delete "HCI", insert in place thereof -- HCl --
Line 26, delete "I" insert in place thereof -- 1 --;

Column 26,
Line 2, delete "HCI", insert in place thereof -- HCl --
Line 2, delete "." following "was"

Column 28,
Line 31, delete "," following "the";

UNITED STATES PATENT AND TRADEMARK OFFICE
CERTIFICATE OF CORRECTION

PATENT NO. : 6,509,128 B1
DATED : January 21, 2003
INVENTOR(S) : Everaerts, Alert I.

It is certified that error appears in the above-identified patent and that said Letters Patent is hereby corrected as shown below:

Column 29,
Line 20, delete "." following "toner";
Line 44, delete "m" following "wt";
Line 65, delete "the";

Column 30,
Line 45, delete "polethylene", insert in place thereof -- polyethylene --.

Signed and Sealed this

Seventeenth Day of August, 2004

JON W. DUDAS
*Acting Director of the United States Patent and Trademark Office*